United States Patent Office 2,852,335
Patented Sept. 16, 1958

2,852,335

PREPARATION OF MAGNESIUM BOROHYDRIDE

Joseph P. Nigon, Evans City, Pa., assignor to Callery Chemical Company, Pittsburgh, Pa., a corporation of Pennsylvania No Drawing. Application June 22, 1955
Serial No. 517,367

6 Claims. (Cl. 23—14)

This invention relates to a method for the preparation of magnesium borohydride and more particularly it relates to a new and improved method for preparing magnesium borohydride directly from magnesium metal by reaction with diborane and hydrogen.

The borohydrides have received considerable attention in recent years because of their importance as selective reducing agents in a variety of chemical reactions and as an excellent portable source of hydrogen. Only the alkali metal borohydrides, however, are commercially available because other borohydrides such as the alkaline earth borohydrides are more difficult to prepare. Magnesium borohydride is of particular interest because of its high hydrogen content per unit weight. Several methods for preparing this borohydride are known among which are the following: (1) The reaction of diethylmagnesium with an excess of diborane in the presence of benzene (2) the reaction of magnesium hydride with trimethyl borate (3) a metathetic reaction between sodium borohydride and a magnesium halide, and (4) the reaction of magnesium metal with an alkali metal borohydride in the presence of mercury. These methods while generally operative have certain disadvantages such as the use of expensive or not readily available starting materials and the relatively low yields obtained. Thus, it would be highly desirable if a simple and more economical method for preparing magnesium borohydride could be developed.

It is an object of this invention to provide a new and improved method for preparing magnesium borohydride.

Another object is to provide a simple and economical method for preparing magnesium borohydride from magnesium metal, diborane and hydrogen.

Other objects will become apparent from time to time throughout the following specification and appended claims.

This new and improved method for preparing magnesium borohydride will be described more fully hereinafter and the novelty thereof will be particularly pointed out and distinctly claimed.

This invention is based upon the discovery that magnesium borohydride can be prepared directly from magnesium metal by reaction under pressure with diborane and hydrogen in the presence of an inert solvent. The conditions of temperature and pressure for this reaction are much less rigorous than those required to prepare magnesium hydride from magnesium and hydrogen. By carrying out the reaction in a single step it is possible to prepare magnesium borohydride directly at lower temperatures and considerably lower pressures, thus eliminating the necessity of preparing magnesium hydride or a magnesium alkyl.

In a typical experiment, 5 g. (0.2 mols) of 70–80 mesh magnesium metal and 25 ml. of diethyl ether were placed in a 125 ml. superpressure autoclave. Diborane was introduced at a pressure of 390 p. s. i. g. (0.12 mol $B_2H_6$) and finally the autoclave was pressurized with sufficient hydrogen to produce a total pressure of 800 p. s. i. g. (0.12 mol $H_2$). The autoclave was rotated and heated continuously for 44 hours at 50° C. When the autoclave was opened at the end of the run, hydrogen was the only gas recovered thus indicating that all the diborane was consumed. The contents were removed and the unreacted magnesium metal was separated by a Soxhlet extraction of the product with diethyl ether. The ether soluble material was recovered as a white solid by evaporating the ether at room temperature under vacuum. The isolated while solid was analyzed for magnesium and boron in milliatoms per gram (mat./g.) and for hydridic hydrogen expressed in millimoles of hydrogen evolved upon hydrolysis of one gram of sample with the following results:

Mg—6.2 mat./g; B—15.1 mat./g.; hydridic H—
54.5 mmoles/g.

These analytical values correspond to magnesium borohydride monoetherate (theoretical: Mg—7.8 mat./g.; B—15.4 mat./g.; hydridic H—62.4 mmoles/g.). A 46% yield of $Mg(BH_4)_2 \cdot (C_2H_5)_2O$ based on the magnesium consumed was obtained. Attempts to remove the solvent by heating under vacuum at 50° C. for 30 hours resulted in the removal of part of the solvent together with partial decomposition of the product.

In other experiments which were carried out at room temperature, no product was recovered. Thus, a temperature of 50° C. was found to give the best yields. However, any temperature may be used within the range from moderately above room temperature to the decomposition temperature of magnesium borohydride. Dimethyl ether can also be used as a solvent and can be removed much easier from the magnesium borohydride formed. Other data show that this process is operative at diborane and hydrogen pressures as low as 350 p. s. i. g. The only effect of higher pressures appears to be an increase in the reaction rate. There is no apparent upper limit of pressure.

Having thus described this invention fully and completely as required by the patent laws, it will be obvious to those skilled in the art that other variations are possible and that within the scope of the appended claims this invention may be practiced otherwise than as specifically described without departing from the spirit and scope thereof.

What is desired to be secured by United States patent is:

1. A method of preparing magnesium borohydride which comprises reacting a mixture of finely divided magnesium metal, diborane and hydrogen under pressure at a temperature above room temperature to the decomposition temperature of magnesium borohydride in the presence of an inert solvent and recovering the magnesium borohydride from the reaction mixture.

2. A method according to claim 1 in which the solvent is a lower alkyl ether.

3. A method according to claim 1 in which the partial pressures of diborane and hydrogen are each above 350 p. s. i. g.

4. A method according to claim 1 in which the reaction is carried out at a temperature of 50° C.

5. A method of preparing magnesium borohydride which comprises reacting finely divided magnesium metal with diborane and hydrogen at partial pressures of about 400 p. s. i. g. each at a temperature of about 50° C. in the presence of diethyl ether and recovering the magnesium borohydride formed.

6. A method according to claim 2 in which said ether is dimethyl ether.

References Cited in the file of this patent

UNITED STATES PATENTS 2,545,633    Schlesinger et al. -------- Mar. 20, 1951

OTHER REFERENCES

Wiberg et al.: "Chem. Abstracts," vol. 45, column 4593 (1951).

Wiberg et al.: "Chem. Abstracts," vol. 46, column 4943 (1952).

Wiberg et al.: "Chem. Abstracts," vol. 47, columns 2073, 2074, 2075 (1953).